United States Patent
Deng (10) Patent No.: US 6,539,448 B1
(45) Date of Patent: Mar. 25, 2003

(54) PRIORITY FIRST COME FIRST SERVE INTERRUPT CONTROLLER

(75) Inventor: Brian Tse Deng, Richardson, TX (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 09/580,810

(22) Filed: May 26, 2000

(51) Int. Cl.[7] .......................... G06F 13/24; G06F 13/26
(52) U.S. Cl. ........................ 710/260; 710/263; 710/264
(58) Field of Search ............................... 710/260, 263, 710/264, 265

(56) References Cited

U.S. PATENT DOCUMENTS

| | | | | |
|---|---|---|---|---|
| 3,599,162 A | * | 8/1971 | Byrns et al. ................ | 710/264 |
| 3,829,839 A | * | 8/1974 | Jeane ........................ | 710/264 |
| 4,172,284 A | * | 10/1979 | Heinrich et al. ........... | 710/264 |
| 5,568,643 A | * | 10/1996 | Tanaka ...................... | 710/260 |
| 5,931,936 A | * | 8/1999 | Chung et al. .............. | 710/263 |
| 6,247,091 B1 | * | 6/2001 | Lovett ....................... | 370/402 |

* cited by examiner

Primary Examiner—Xuan M. Thai
(74) Attorney, Agent, or Firm—J. Dennis Moore; W. James Brady, III; Frederick J. Telecky (57) ABSTRACT

A microprocessor interrupt controller capable of receiving a plurality of interrupt requests organized in a plurality of groups, at least one of the groups including a plurality of interrupt requests, and providing the interrupts requests to a microprocessor. The controller includes a plurality of storage units corresponding to the plurality of groups and capable of storing one or more of the interrupt requests, by group, and providing the interrupt requests so stored as outputs, on a first in first out basis. At least one write arbiter unit is also included, associated with the storage unit for the at least one of the groups including a plurality of interrupt requests, for providing simultaneously pending interrupt requests of the at least one of the groups to the associated storage unit on a priority basis. A priority encoder unit is included for receiving the interrupt requests stored in the storage units and providing the interrupt requests as outputs for processing by the microprocessor, on a priority basis.

5 Claims, 8 Drawing Sheets

PRIORITY FIRST COME FIRST SERVE INTERRUPT CONTROLLER

TECHNICAL FIELD OF THE INVENTION

This invention relates to interrupt controllers in microprocessors, and more particularly relates to processing interrupts arranged in groups on a priority basis.

BACKGROUND OF THE INVENTION

Figure 1:
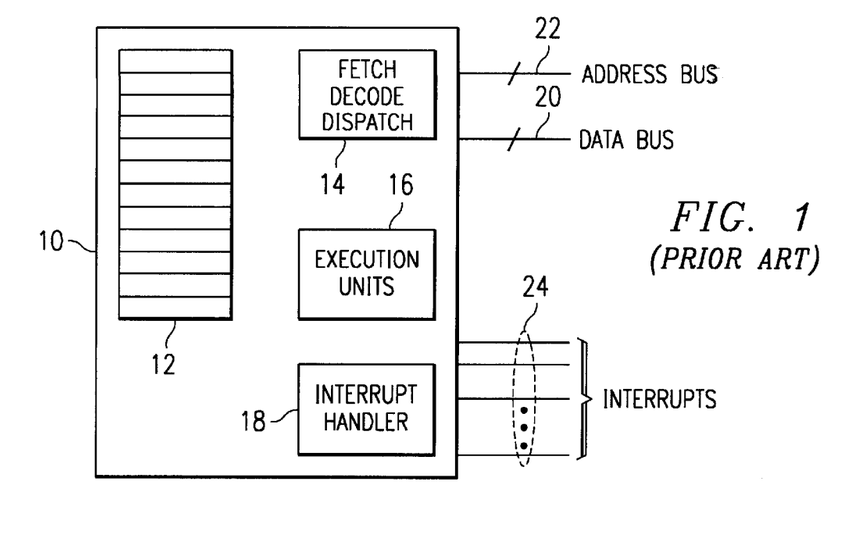
FIG. 1 is a block diagram of a prior art microprocessor, including an interrupt handler.

Microprocessors are equipped with the capability of responding to interrupt signals that interrupt processing within the microprocessor and invoke a service routine dedicated to the handling of the event with which the interrupt is associated. A typical microprocessor architecture is shown in FIG. 1 in which can be seen a microprocessor 10 in which are a stack of registers 12, units 14 for performing fetch, decode and dispatch of instructions, execution units 16 for executing instructions, and an interrupt handler 18. The instructions and data are passed to and from external memory (not shown) on a data bus 20, and are written to or read from locations in the external memory identified by memory addresses on an address bus 22. Interrupts are communicated to the interrupt handler 18 via dedicated interrupt lines 24. An interrupt that is communicated by way of a dedicated interrupt line directly to the microprocessor interrupt handler 18 to invoke an associated service routine are called hardware interrupts. In general, the microprocessor operates in response to the cycles of a system clock (not shown).

Interrupts may be arranged in groups. For example, the occurrence of interrupts may be signaled by the setting of a bit in a register. One of such registers may be associated with packet data transfer events, for example, another with transmit and receive events, in the case of a microcontroller for a wireless base station, for example. The registers thus reflect a grouping of such interrupts. In addition, interrupts may be assigned differing priorities.

Prior art interrupt controllers handle requests among all interrupts assigned to a given hardware interrupt on a direct priority basis. This requires a very fast system response to any such interrupt request, since otherwise the system may lose track of multiple requests of the same interrupt request. In addition, such prior art interrupt controllers are not able to trace, with hardware, the event sequence within the same group of interrupt requests, which places a burden on the interrupt service routine to attempt to determine the event sequence. This creates undesired complexity in the interrupt service routine, and slows the interrupt process. In addition, such priority basis systems can have the lower priority requests of a given group significantly under-selected if higher priority requests of the same group occur more frequently.

It is therefore desired to have an improved interrupt controller that overcomes the above described deficiencies of the prior art.

SUMMARY OF THE INVENTION

The present invention provides a microprocessor interrupt controller capable of receiving a plurality of interrupt requests organized in a plurality of groups, at least one of the groups including a plurality of interrupt requests, and providing the interrupts requests to a microprocessor. The controller includes a plurality of storage units corresponding to the plurality of groups and capable of storing one or more of the interrupt requests, by group, and providing the interrupt requests so stored as outputs, on a first in first out basis. At least one write arbiter unit is also included, associated with the storage unit for the at least one of the groups including a plurality of interrupt requests, for providing simultaneously pending interrupt requests of the at least one of the groups to the associated storage unit on a priority basis. A priority encoder unit is included for receiving the interrupt requests stored in the storage units and providing the interrupt requests as outputs for processing by the microprocessor, on a priority basis.

These and other features of the invention will be apparent to those skilled in the art from the following detailed description of the invention, taken together with the accompanying drawings.

DETAILED DESCRIPTION OF THE PREFERRED EMBODIMENT

The preferred embodiment of the present invention solves the requirement of tracking interrupt request sequence for data coherence within the same group of interrupt requests. It also accounts for priority requirements between interrupt request groups. An interrupt register provides a direct interrupt service routine start address, which inherits the group ID and member ID of the group.

Figure 2:
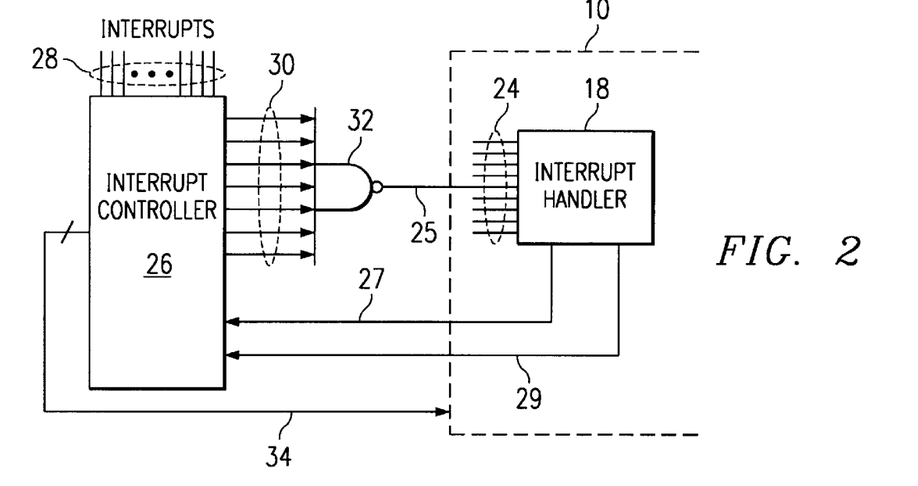
FIG. 2 is a block diagram showing the interrupt handler of the preferred embodiment of the present invention, interfacing with an interrupt handler of a microprocessor.

FIG. 2 shows a microprocessor interrupt controller 26 of the preferred embodiment of the present invention receiving a number of hardware interrupts on hardware interrupt lines 28. The particular number of such hardware interrupts in a given implementation will, in general, depend on the system architecture and implementation decisions. For example, in the preferred, embodiment described herein the number of such interrupts is 32; 128 are provided for in the system architecture, but 96 are not used in the embodiment. The interrupt controller 26 prioritizes the hardware interrupts as they arrive, and generates for each group of interrupts an interrupt signal on an associated interrupt line 30 and an interrupt vector on an associated interrupt vector bus 34. The interrupt vector is as wide as necessary to identify the particular hardware interrupt generating the current hardware interrupt, and in the present example is 8 bits wide.

Figure 3:
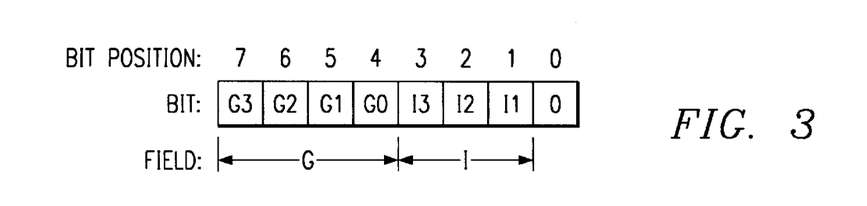
FIG. 3 is a diagram of an interrupt vector definition.

FIG. 3 shows the structure of the interrupt vector. The four most significant bits ("MSBs") constitute the group identifier ("ID") field G, while the four least significant bits ("LSBs") constitute the member ID field I. the LSB of the member ID field is always zero for reasons that are described below.

Returning to FIG. 2, the signals on the interrupt lines 30 are NANDed by NAND gate 32, and the resulting hardware interrupt signal is provided to the interrupt handler 18 on a hardware interrupt line 25 to which the interrupts are dedicated, which is one of the several hardware interrupt lines 24 of the microprocessor. It will be noted that which interrupt line is selected for this is a matter of design choice. It will also be noted that more than one hardware interrupt may have interrupts assigned thereto, and the principles of the present invention applied to one, some or all of such interrupts. An interrupt vector read signal $V_{intrd}$ is provided by the interrupt handler 18 on a signal line 27, and an interrupt acknowledge signal $V_{intak}$ is provided by the interrupt handler 18 on a signal line 29.

Figure 4:
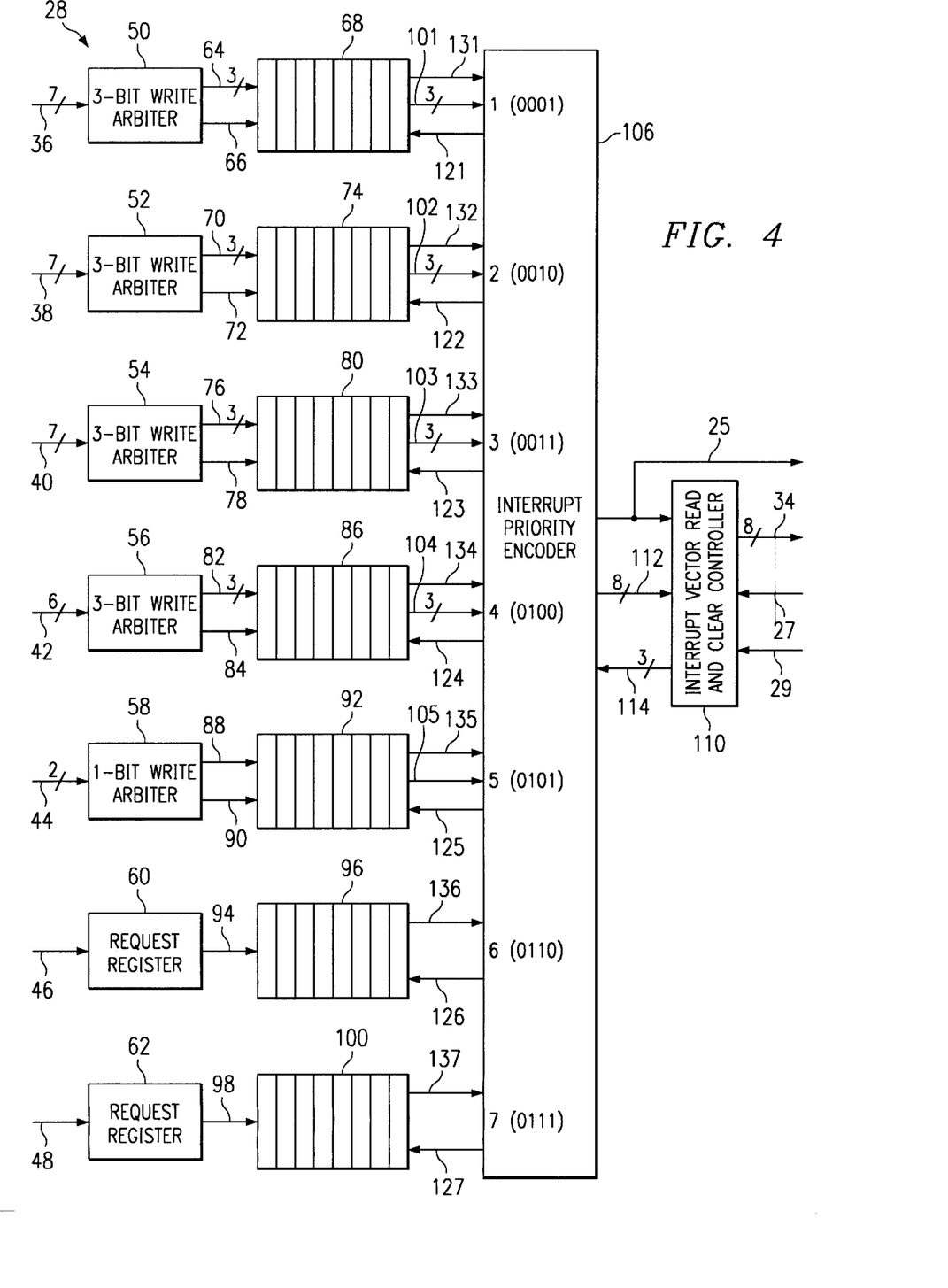
FIG. 4 is a high level block diagram of the preferred embodiment of the present invention.

In accordance with the preferred embodiment of the present invention an 8-deep, first-in-first-out memory ("FIFO") is provided for each of one or more groups of interrupts in the interrupt controller 26 shown in FIG. 2. Each interrupt request from such a group is temporarily stored in its associated FIFO, and the value stored in the FIFO is the member ID of its group. FIG. 4 is a block diagram showing the construction of the interrupt controller 26 of FIG. 2. The interrupt lines 28 can be seen in the left of the figure, being arranged in groups. The interrupts, and the interrupt vector values for those interrupts, in hex format, are shown in Table 1.

TABLE 1

| Group | Member | G[3:0] | I[3:1] | Vector | Comment |
|---|---|---|---|---|---|
| 0 | 0 | 0 | 0 | 00 | Not used |
| 1 | 0 | 1 | 0 | 10 | Not used |
|   | 1 | 1 | 1 | 12 |   |
|   | 2 | 1 | 2 | 14 |   |
|   | 3 | 1 | 3 | 16 |   |
|   | 4 | 1 | 4 | 18 |   |
|   | 5 | 1 | 5 | 1A |   |
|   | 6 | 1 | 6 | 1C |   |
|   | 7 | 1 | 7 | 1E |   |
| 2 | 0 | 2 | 0 | 20 | Not used |
|   | 1 | 2 | 1 | 22 |   |
|   | 2 | 2 | 2 | 24 |   |
|   | 3 | 2 | 3 | 26 |   |
|   | 4 | 2 | 4 | 28 |   |
|   | 5 | 2 | 5 | 2A |   |
|   | 6 | 2 | 6 | 2C |   |
|   | 7 | 2 | 7 | 2E |   |
| 3 | 0 | 3 | 0 | 30 |   |
|   | 1 | 3 | 1 | 32 |   |
|   | 2 | 3 | 2 | 34 |   |
|   | 3 | 3 | 3 | 36 |   |
|   | 4 | 3 | 4 | 38 |   |
|   | 5 | 3 | 5 | 3A |   |
|   | 6 | 3 | 6 | 3C |   |
|   | 7 | 3 | 7 | 3E | Not used |
| 4 | 0 | 4 | 0 | 40 |   |
|   | 1 | 4 | 1 | 42 |   |
|   | 2 | 4 | 2 | 44 |   |
|   | 3 | 4 | 3 | 46 |   |
|   | 4 | 4 | 4 | 48 |   |
|   | 5 | 4 | 5 | 4A |   |

TABLE 1-continued

| Group | Member | G[3:0] | I[3:1] | Vector | Comment |
|---|---|---|---|---|---|
|   | 6 | 4 | 6 | 4C | Not used |
|   | 7 | 4 | 7 | 4E | Not used |
| 5 | 0 | 5 | 0 | 50 |   |
|   | 1 | 5 | 1 | 52 |   |
|   | 2–7 | 5 | 2→7 | 54→5E | Not used |
| 6 | 0 | 6 | 0 | 60 |   |
|   | 1–7 | 6 | 1→7 | 62→6E | Not used |
| 7 | 0 | 7 | 0 | 70 |   |
|   | 1–7 | 7 | 1→7 | 72→7E | Not used |
| 8–15 | 8–15 | x | x | 80→FE | Not used |

Note that the actual vector value is the concatenated combination of the G and I fields. As mentioned above, the LSB of the I field is always zero. The reason for this is that the interrupt vector is an address that identifies the location of the first of two bytes that constitute a pointer to the first instruction in the associated interrupt service routine. These two bytes are stored in contiguous addresses, and therefore the interrupt vector addresses must differ by two. Hence, the LSB of the I field is always zero.

Table 1 also shows those architected interrupts not actually used in the implementation. In addition, note that the interrupts in Table 1 are given priority in accordance with their ordering by vector value. Thus, the highest priority interrupt actually used is vector 70 (group 7, member 0), and the lowest priority interrupt actually used is vector 12 (group 1, member 1).

Returning now to FIG. 4, the seven interrupts that are used in group 1 are provided on interrupt lines 36 to a 3-bit write arbiter 50. The seven interrupts that are used in group 2 are provided on interrupt lines 38 to a 3-bit write arbiter 52. The seven interrupts that are used in group 3 are provided on interrupt lines 40 to a 3-bit write arbiter 54. The six interrupts that are used in group 4 are provided on the six interrupt lines 42 to a 3-bit write arbiter 56. The two interrupts that are used in group 5 are provided on the two interrupt lines 44 to a 1-bit write arbiter 58. The one interrupt that is used in group 6 is provided on line 46 to a request register 60, while the one interrupt that is used in group 7 is provided on line 48 to a request register 62.

The 3-bit write arbiter 50 has two outputs, a data bus 64 carrying group 1 write data, and a line 66 carrying a group 1 write enable signal $WE_{g1}$, that are both provided to an 8×3 FIFO 68. Likewise, the 3-bit write arbiter 52 has two outputs, a group 2 write data bus 70 and a group 2 enable signal line 72, that are both provided to an 8×3 FIFO 74. Further, the 3-bit write arbiter 54 has two outputs, a group 3 write data bus 76 and a group 3 enable signal line 78, that are both provided to an 8×3 FIFO 80, and the 3-bit write arbiter 56 has two outputs, a group 4 write data bus 82 and a group 4 enable signal line 84, that are both provided to an 8×3 FIFO 86. The 1-bit write arbiter 58 has two outputs, a group 5 write data bus 88 and a group 5 enable signal line 90, that are both provided to an 8×1 FIFO 92. The request register 60 has a single output, a group 6 enable line 94 that is provided to a "virtual FIFO" 96 of size 8×0, and the request register 62 has a single output, a group 7 enable line 98 that is provided to a "virtual FIFO" 100 of size 8×0. Each of the virtual FIFOs are implemented as registers storing read and write pointers.

The group 1 FIFO 68 has two outputs, a 3-bit wide bus 101 carrying the output register contents $D_{og1}$, and a signal line 131 carrying the group 1 FIFO empty signal $E_{g1}$, both of which are provided to an interrupt priority encoder ("IPE") 106. The IPE 106 has an output line 121 carrying a group 1 read enable signal $RE_{g1}$, that is provided as an input to the group 1 FIFO 68. The FIFOs for groups 2 through 7 all have similar signal lines and busses as group 1, connecting them to the IPE 106 and performing the same functions. That is, each such FIFO has a FIFO empty signal line 132, 133, 134, 135, 136, 137, provided to the IPE 106. In addition, the IPE 106 has for each such FIFO an output line carrying a read enable signal 122, 123, 124, 125, 126, 127, that is provided as an input to each such FIFO. Note, however that, while FIFOs 74, 80 and 86, like FIFO 68, each have a 3-bit wide bus carrying its output register contents, 8×1 FIFO 92 has only a one bit line, since only two interrupts are served in Group 5, and virtual FIFOs 96 and 100 actually have no register content output, since Groups 6 and 7 only serve a single interrupt each.

The IPE 106 has two other outputs, the signal line 25 carrying the interrupt request signal $V_{intrq}$ and the 8-bit wide bus 112 carrying the contents of an interrupt vector register (not shown), which stores the interrupt vector $V_{intr}$ currently "winning," that is, the $V_{intr}$ having the highest priority between groups at the present time. The IPE 106 provides the hardware interrupt on line 25 not only to the interrupt handler 18 (FIG. 2), but also to a control unit which may be called the interrupt vector read and clear controller (IVRCC) 110. Bus 112 carrying $V_{intr}$ is also provided as an input to the IVRCC 110. The IVRCC 110 provides a clear served interrupt request signal $CL_{sirs}$ on line 114 to the IPE 106. The IVRCC 110 provides the current interrupt vector $V_{intr}$ on line 34 to the interrupt handler 18 (FIG. 2), and receives $V_{intrd}$ on signal line 27 and $V_{intak}$ on signal line 29, both from the interrupt handler 18 (FIG. 2).

The interrupt controller 26 shown in FIG. 4 operates as follows. In any given system clock cycle one or more interrupts may be asserted on any of the lines 28. In fact, in a given system clock cycle two or more interrupts may be asserted within a group of interrupt lines, such as interrupt lines 36. For groups in which two or more interrupts are being used, its associated arbiter operates to select the highest priority interrupt being asserted in that cycle to be processed in that cycle, i.e., to be the one to be provided in that cycle to its associated FIFO. Interrupts still pending in the group are acted on in the next cycle, and so on, until all interrupts have been so processed. For example, if interrupt members 3, 4 and 6 of group 1 are asserted in a given cycle n, the 3-bit write arbiter 50 selects the highest priority interrupt in that group, in this case member 6, to be processed in the current cycle, while the other two interrupts remain pending. In cycle n+1 arbiter 50 performs an arbitration function, in that it selects the highest priority interrupt in that group still pending, in this case member 4, to be processed in the current cycle, while the other interrupt remains pending. Finally, in cycle n+2 member 3 is processed. If another interrupt is asserted during this process, it is evaluated for priority along with all the other pending interrupts. In this way arbitration is accomplished, and the interrupts within groups are processed on a priority basis. In the case of groups 6 and 7, only one interrupt is used, so there is no arbitration within those "groups." These groups therefore only have a 1-bit register (registers 60 and 62, respectively) to store the single interrupt when asserted.

The interrupt selected by the arbiter, or register, as the case may be, is, as described above, provided to the associated FIFO. In the case of groups 1 through 5 this is accomplished by the presentation of the member ID and a write enable signal to the FIFO. The hardware for this is dedicated to the group, and so the group ID is implied and need not be generated at this stage. The enable signal causes the FIFO to store the member ID. For example, the group 1 write arbiter 50 sends the currently processed interrupt member ID on lines 64 and the enable signal for that interrupt on line 66. For groups 6 and 7, since only one interrupt is used not only is the group ID implied, the member ID is also implied. Therefore, only an enable signal is presented by the request register (60, 62) to the associated "virtual FIFO" (96, 100), on lines 94 and 98, respectively.

As a result of the above described arbitration and storage into the several FIFOs, in any given system clock cycle one or more interrupts may be at the output storage location of its associated FIFO, presented to the next unit, the IPE 106. The signaling of the presence of such an interrupt at the output storage location of a FIFO is accomplished by the absence of a signal on the associated FIFO empty line. For example, when the group 1 FIFO 68 has an interrupt at its output, G1 FIFO empty signal line 131 is inactive, indicating "not empty." The IPE 106, in turn, selects among those interrupts on a priority basis for processing in that cycle, i.e., to be provided to the microprocessor on the dedicated hardware interrupt line 25, and to have its associated interrupt vector provided to the system on lines 34. Note that in providing the interrupt vector, in the case of interrupts in groups 1 through 5 the IPE 106 adds the group ID to the member ID received from the respective group's FIFO, and in the case of groups 6 and 7 the IPD 106 also constructs the entire vector. The IVRCC 110 controls the reading of the current interrupt vector $V_{intr}$ to the interrupt handler 18 (FIG. 2), and ensures that the proper FIFO is cleared after such a read. The IVRCC 110 is described in detail below.

Figure 5:
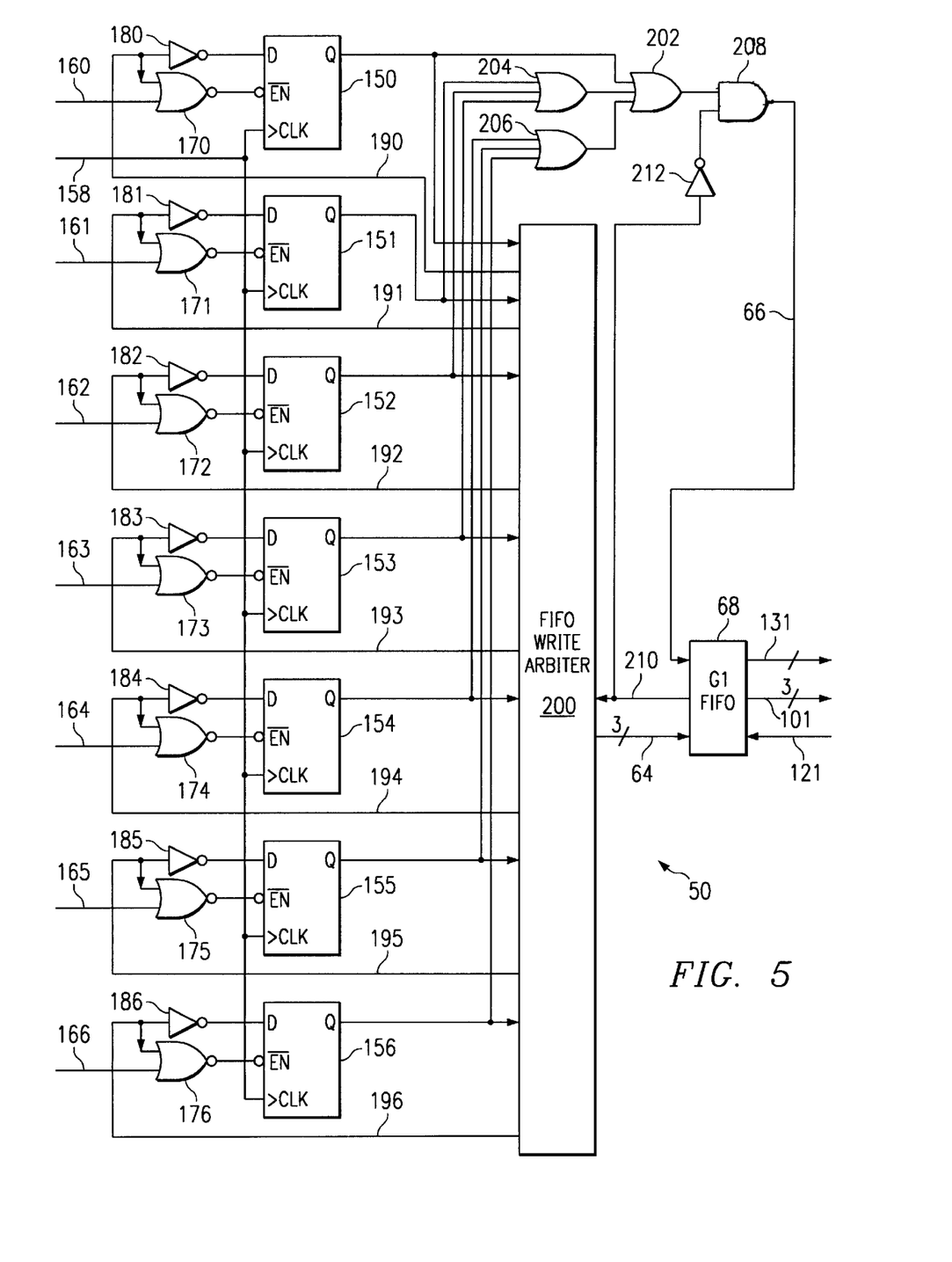
FIG. 5 is a block diagram of a 3-bit arbiter shown in FIG. 4.

FIG. 5 is a detailed diagram of 3-bit write arbiter 50 of FIG. 4, together with a block representing the group 1 8×3 FIFO 68. Construction of the other 3-bit write arbiters 52, 54, 56, is the same as that of 3-bit write arbiter 50. Seven DQ flip flops 150–156 can be seen, each being driven by a system clock signal on clock line 158. Using the notation GxMy to identify an interrupt, where Gx is the group ID and My is the member ID, Interrupts G1M1 through G1M7 are provided on inputs 160–166, respectively. Note that, together, inputs 160–166 constitute input lines 36 of FIG. 4. These inputs 160–166 are provided to one input of 2-input NOR gates 170–176, respectively. After twice being inverted, the outputs of NOR gates 170–176 are provided to an enable input of flip flops 150–156, respectively. The other inputs to the 2-input NOR gates 170–176 are flip flop clear signals provided by a FIFO write arbiter 200 on lines 190–196, respectively. Lines 190–192 are also provided to the inputs of inverters 180–186, respectively, the outputs of which are provided to the D inputs of DQ flip flops 150–156, respectively.

The Q outputs of flip flops 150–156 are provided to the inputs of OR gates 202, 204, 206, which together perform the function of a single 7-input OR gate having the seven Q outputs of flip flops 150–156 as its inputs. The output of this arrangement of OR gates is provided to one input of a 2-input AND gate 208. The output of AND gate 208 is signal line 66, and is provided to the write enable input of FIFO 68. The member field I[3:1] (FIG. 3) of the currently selected interrupt vector is provided on lines 64 to FIFO 68. A G1 FIFO full signal $F_{G1}$ is provided on a signal line 210 to the FIFO write arbiter 200 and to the input of an inverter 212, the output of which is the second input of 2-input AND gate 208. Note that this signal line 210 was omitted from FIG. 4 in the interest of brevity and clarity. It will be understood that FIFO full signals lines, having the same function, are also provided from FIFOs 74, 80, 86, 92, 96 and 100 (FIG.

4). The G1 FIFO full signal signals that the G1 FIFO is full, and causes the FIFO write arbiter 200 to hold operations, thus preserving pending interrupts until a storage location in FIFO 68 becomes available. Through the action of inverter 212 and AND gate 208 the G1 FIFO full signal also stops further enable signals from being presented to the G1 FIFO 68, which enable signals could cause the loss of interrupts stored in FIFO 68 but not yet processed by the microprocessor.

The 3-bit write arbiter 50 of FIG. 5 operates as follows. Assume for example that an interrupt G1M2 arises in a clock cycle. This activates line 162, enabling flip flop 152. Assuming that all previous G1M2 interrupts have been processed by FIFO write arbiter 200, flip flop clear line 192 is low. Thus, a one is stored in flip flop 152 in this cycle, which is presented at the Q output of-flip flop 152. The one at the Q output of flip flop 152 is provided through OR gates 204 and 202 and AND gate 208 on line 66 to FIFO 68 as a write enable signal. The one at the Q output of flip flop 152 is also provided to FIFO write arbiter 200. Provided the G1M2 interrupt is the highest priority interrupt that has been latched in one of the flip flops 150–156 the FIFO write arbiter 200 presents the member ID for the G1M2 interrupt on lines 64 to FIFO 68, and activates flip flop clear line 192, i.e., sets it high. This removes the one from the D input of flip flop 152 while presenting a low signal, through NOR gate 172, to the inverting enable input of flip flop 152. Thus, a zero is stored in flip flop 152., completing the operation. The circuitry for interrupts G1M1 and G1M3–G1M7 operates in the same way.

Figure 6:
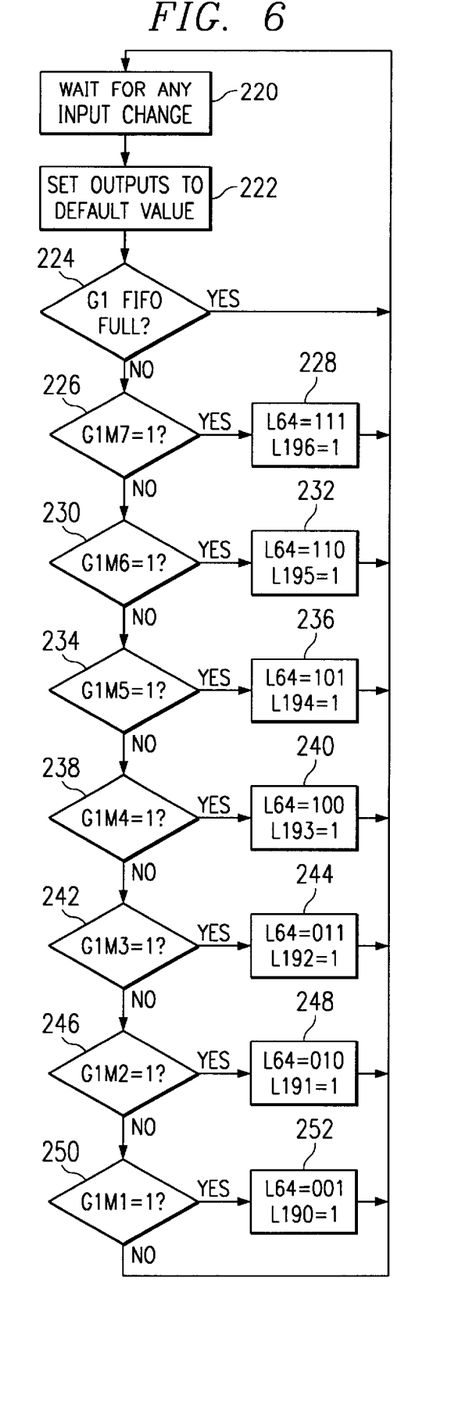
FIG. 6 is a flow chart showing the operation of the 3-bit arbiter shown in FIG. 5.

FIG. 6 is a flow chart showing the operation of the FIFO write arbiter 200 of FIG. 5. Arbiter 200 is a state machine operating in accordance with this flow chart. The start state is simply waiting for any input change 220 during which the outputs are set to default values 222, and signal line 210 (FIG. 5) is examined to determine if FIFO 68 is full 224. If so, the system loops to start state 220. If not, the signal line carrying the output of flip flop 156 (FIG. 5) is examined to determine if G1M7 is presenting an interrupt 226. If so, the 3 MSBs of the member ID field I (L64) are set to 111, line 196 is set to a one 228, signaling a clear of flip flop 156 (FIG. 5), and the system loops to start state 220 to wait for the G1M7 request to clear and to check any pending request. If not, the inquiry proceeds to the next lower priority interrupt, and the same steps 230, 232, are repeated for that interrupt, with appropriate parameters for that interrupt, i.e., interrupt signal line, member ID field values, flip flop to clear. Likewise, the inquiry proceeds in reverse sequence to all other interrupts, and the same steps are repeated 234, 236, 238, 240, 242, 244, 246, 248, 250, 252, with appropriate parameters for those interrupts.

FIGS. 7, 8, 9, and 10 together show the construction of the group 1 FIFO 68, the IPE 106, and of the interrupt vector read & clear controller 110.

Figure 7:
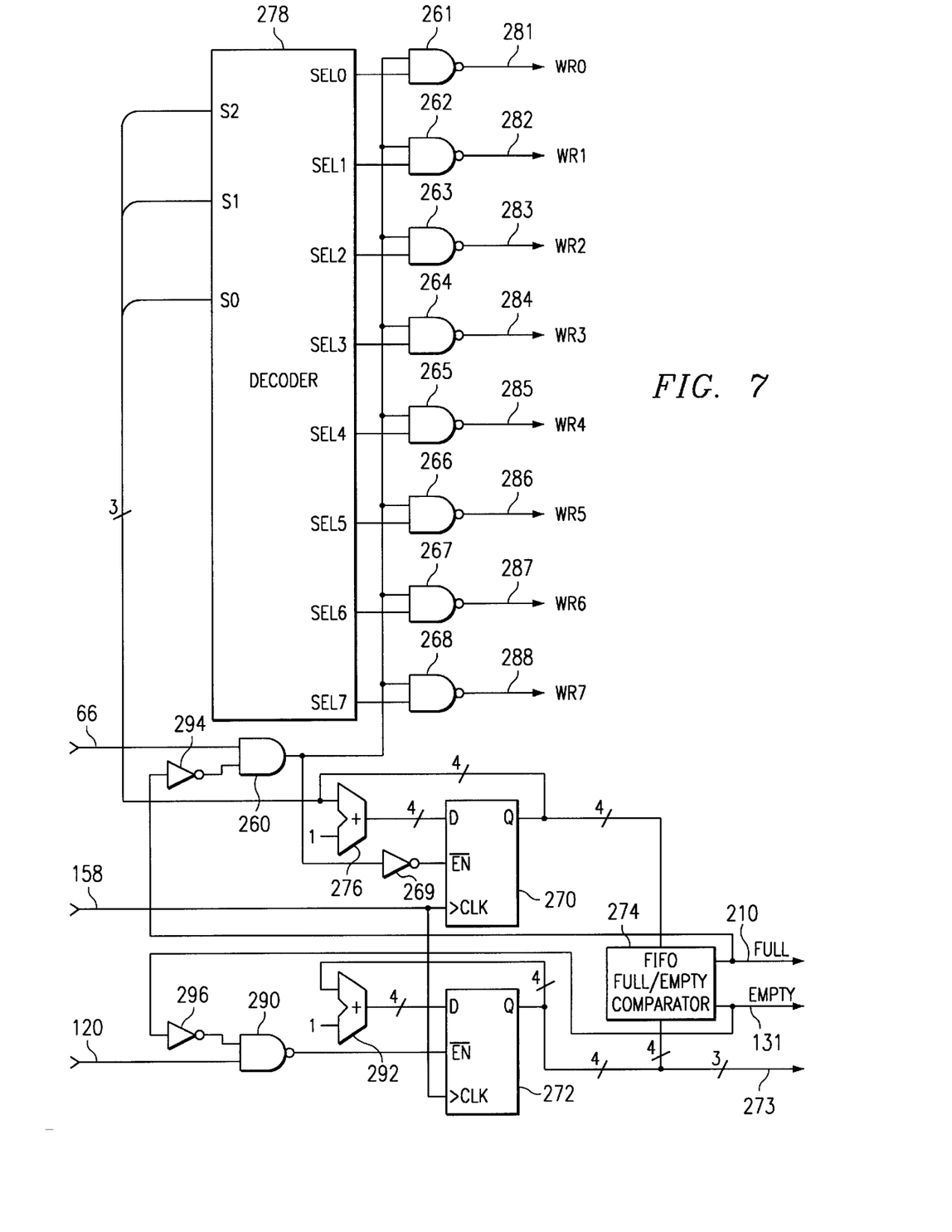
FIG. 7 is a portion of the group 1 FIFO 68 of FIG. 4, implementing a first portion of the group 1 FIFO flip-flops read/write logic.

Turning now to FIG. 7, a portion of the group 1 FIFO 68 is shown, implementing a first portion of the group 1 FIFO flip-flops read/write logic. Line 66 carrying $WE_{g1}$ is provided to one input of an AND gate 260. The output of AND gate 260 is provided as an input to each of eight NAND gates 261–268, and to the input of an inverter 269. The output of inverter 269 is provided to the inverting enable input of a 4-bit DQ flip-flop 270 (i.e., four DQ flip flops operating in parallel) used as a FIFO write pointer. The lower three bits of the output of flip-flop 270 are used as an address to determine which element of the 8×3 FIFO to write to. The system clock signal is provided, on line 158, to the clock input of flip-flop 270, as well as to the clock input of a second 4-bit DQ flip flop 272 (i.e., four DQ flip flops operating in parallel) used as a FIFO read pointer. The lower three bits of the output of flip-flop 272 are used as an address to determine which element of the 8×3 FIFO to read from.

The four bit Q output of flip-flop 270 is provided to one input of a FIFO full/empty comparator 274 and to one input of a 4-bit, two input adder 276. The other input of adder 276 is hard wired to logical 1. The output of adder 276 is provided to the D input of flip flop 270. The three LSBs of the output of write pointer 270 are provided as inputs to a decoder 278 such that the LSB is provided to the S0 input of decoder 278, the next to LSB is provided to the S1 input and the third LSB is provided to the S2 input of decoder 278. The eight outputs SEL0–SEL7 of decoder 278 are provided to the other inputs of the NAND gates 261–268, respectively. The output lines 281–288 of NAND gates 261–268 carry write-to-register signals $WR_0$–$WR_7$, respectively.

Line 121 carrying $RE_{g1}$ is provided to one input of an NAND gate 290. The output of NAND gate 290 is provided as an input to the inverting enable input of 4-bit DQ flip-flop 272. The 4-bit Q output of flip-flop 272 is provided to a second input of FIFO full/empty comparator 274 and to one input of another 4-bit, two input adder 292. The three LSBs of the output of flip-flop 272 are provided on lines 273 as a read pointer signal RR[2:0]. The other input of adder 292 is hard wired to logical 1. The output of adder 292 is provided to the D input of flip flop 272.

One output of comparator 274 is line 210 carrying the FIFO G1 full signal $F_{g1}$. In addition to being an output of the circuit in FIG. 7, line 210 is also connected to the input of an inverter 294, the output of which is connected to the other input of AND gate 260. The other output of comparator 274 is line 131 carrying the FIFO G1 empty signal $E_{g1}$. In addition to being an output of the circuit in FIG. 7, line 131 is also connected to the input of an inverter 296, the output of which is connected to the other input of NAND gate 290.

The circuit in FIG. 7 operates as follows to implement FULL and EMPTY determination functions for the group 1 FIFO, and to provide select signals to select appropriate registers for reading and writing so as to implement a first-in-first-out storage function. Assuming that line 210 is signaling that the group 1 FIFO is not full (i.e., line 210 is not active), when $WE_{g1}$ goes active on line 66 the NAND gates 261–268 are all enabled to allow an active low output, when their other input is active (high). Note that for any given value on S2, S1, S0, only one of the SEL0–SEL7 outputs is active. In addition, flop-flop 270 is reset to a zero state, i.e., 0000. The three LSBs of this value are provided to the decoder 278, which activates the SEL0 output, causing $WR_0$ to appear on line 281.

On the next clock cycle, data on line 64 is written to 3-bit register 330 (FIG. 9, explained below) and the output of adder 276 is now a 1, i.e., 0001, which is latched in flip-flop 270. This is provided to adder 276, to comparator 274, and to decoder 278. When $WE_{g1}$ on line 66 is active, decoder 278 activates the SEL1 output, causing $WR_1$ to appear on line 282. The process continues with adder 276 counting cyclically, returning to zero after a maximum count, and, consequently, lines 281–288 being activated sequentially and incrementally, as just described, with the process wrapping back to line 281 after line 288 is activated. The output of flip-flop 270 is continuously provided to comparator 274.

Now, assuming that line 131 is signaling that the group 1 FIFO is not empty (i.e., line 131 is not active), when $RE_{g1}$ goes active on line 121, flip-flop 272 is enabled to store the value appearing at its D input. The circuit is reset to a zero state, i.e., 0000, which is stored in flop-flop 272.

On the next clock rising edge, provided $RE_{g1}$ is active on line 121, the output of adder 292 is now a 1, i.e., 0001, which is latched in flip-flop 272. This is provided to adder 292 and to comparator 274. The three LSBs are provided on lines 273 as the RR[2:0] signal. The output of flip-flop 272 is continuously provided to comparator 274. The process continues with adder 292 counting cyclically, returning to zero after a maximum count.

In this way, the WRi(i=0–7) signals always enable the storage location for writing, and the RR pointer always points to the storage location for reading, so as to implement a FIFO function.

The FIFO full/empty comparator 274 implements the following logic.

1. $F_{g1}$ (indicating a full g1 FIFO) is active when: the MSB of the output of flip-flop 270 is not equal to the MSB of the output of flip-flop 272, AND the three LSBs of the output of flip-flop 270 are equal to the three LSBs of the output of flip-flop 272.
2. $E_{g1}$ (indicating an empty g1 FIFO) is active when: all four bits of the output of flip-flop 270 are equal to all four bits of the output of flip-flop 272.

Figure 8:
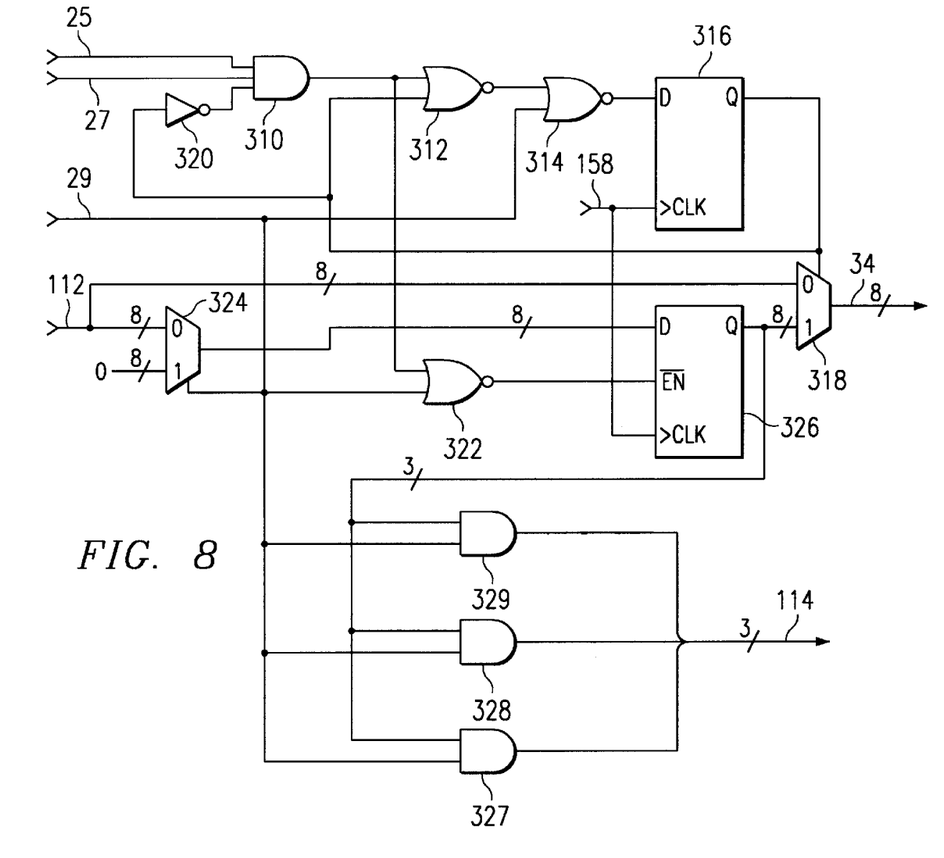
FIG. 8 is a logic diagram showing the interrupt vector read & clear controller 110 of FIG. 4.

Turning now to FIG. 8, there is shown the interrupt vector read & clear controller 110. The interrupt request signal $V_{intrq}$ is provided on line 25 to one input of a 3-input AND gate 310. The interrupt vector read signal $V_{intrd}$ is provided on line 27 to another input of AND gate 310. The output of AND gate 310 is provided to one input of a first 2-input NOR gate 312. The output of NOR gate 312 is provided to one input of a second 2-input NOR gate 314. Signal line 29 carrying the interrupt acknowledge signal $V_{intak}$ is provided to the other input of NOR gate 314, to a first input of a 2-input NOR gate 322, and to the SELECT input of a first 2-input MUX (each input being 8 bits wide) 324. The output of NOR gate 314 is provided to the D input of a 1-bit DQ flip-flop 316. The Q output of flip-flop 316 is provided to the SELECT input of a second 2-input MUX (each input being 8 bits wide) 318, to the other input of NOR gate 312, and to the input of an inverter 320. The output of inverter 320 is provided to the third input of AND gate 310. Eight bit wide bus 112, carrying the interrupt vector $V_{intr}$ currently winning, is provided to the "0" input of MUX 324 and to the "0" input of MUX 318. The "1" input of MUX 324 is tied to zero, i.e., 00000000. The 8-bit output of MUX 324 is provided to the D input of an eight bit DQ flip-flop 326 (i.e., eight DQ flip flops operating in parallel). The Q output of flip-flop 326, which is either the latched value of $V_{intr}$ or the default value 00000000, is provided to the "1" input of MUX 318. Bits [6:4] of the Q output of flip-flop 326 are provided to one input of three 2-input AND gates 327, 328, 329, such that bit 4 is provided to AND gate 327, the bit 5 to AND gate 328, and bit 6 is provided to AND gate 329. Line 29 is provided to each of the other inputs to AND gates 327, 328, 329. The outputs of, together, comprise the clear served interrupt request signal $CL_{sirs}$, and are provided on bus 114. Bus 114 is connected to the IPE 106 (FIG. 4). Bus 114 carries the Group value [2:0] to indicate which group's FIFO has been serviced, and therefore requires a FIFO read enable signal to remove the interrupt request from that FIFO. The 8-bit output of MUX 318 is the interrupt vector, and is provided on bus 34. The system clock signal is provided to the clock inputs of flip-flop 316 and flip-flop 326 on line 158.

The interrupt vector read & clear controller 110 of FIG. 8 operates as follows. In the initial, reset condition both flip-flops 316, 326, output zero. This causes the interrupt vector on bus 112 to be provided to bus 34. When the interrupt request signal $V_{intrq}$ on line 25 and the interrupt vector read signal $V_{intrd}$ on line 27 are active, provided the Q output of flip-flop 316 is low (which is the reset condition), AND gate 310 provides an output 1. Assuming that the interrupt acknowledge signal $V_{intak}$ on line 29 is not active, a 1 is presented to the D input of flip-flop 316, which is latched in the next clock cycle. This causes the "1" input of MUX 318 to be selected. Note that the winning interrupt vector on bus 112 may change, even after such a vector causes an interrupt vector request signal to be sent to the microprocessor. However, in the cycle the microprocessor sends a read signal, the value on bus 112 in that cycle is selected for servicing.

At the next clock rising edge, the microprocessor reads the winning interrupt vector on bus 112. At the same time, the winning interrupt vector is stored in the Q output of flip-flop 326. $V_{intak}$ on line 29 is low, and the output of AND gate 310 is 1. Flip-flop 316 changes from a 0 to a 1, which selects the stored interrupt vector to be provided as an output on bus 34.

The purpose of storing the winning interrupt vector during the microprocessor read interrupt vector is to preserve the winning interrupt Group ID for the servicing of the interrupt request by the microprocessor. After the microprocessor reads the interrupt vector on bus 34, bus 112 may change to the next higher priority interrupt vector, which will not affect the interrupt vector read value on bus 34. The stored winning interrupt vector contains four bits of the interrupt Group ID. The implementation only has seven groups, which only requires bits [6:4]. After the microprocessor finishes the servicing of the current interrupt, it asserts the interrupt acknowledge $V_{intak}$ on line 29. It clears flip-flop 326 to 0, and enables the served interrupt request clear signal $CL_{sirs}$ on bus 114. Bus 114 contains only the interrupt Group ID. IPE 106 uses bus 114 to generate the appropriate FIFO read enable signal to remove the served interrupt request from its FIFO. After this, the next winning interrupt request vector will drive bus 112. If there is no pending interrupt request, 0 will drive bus 112.

Figure 9:
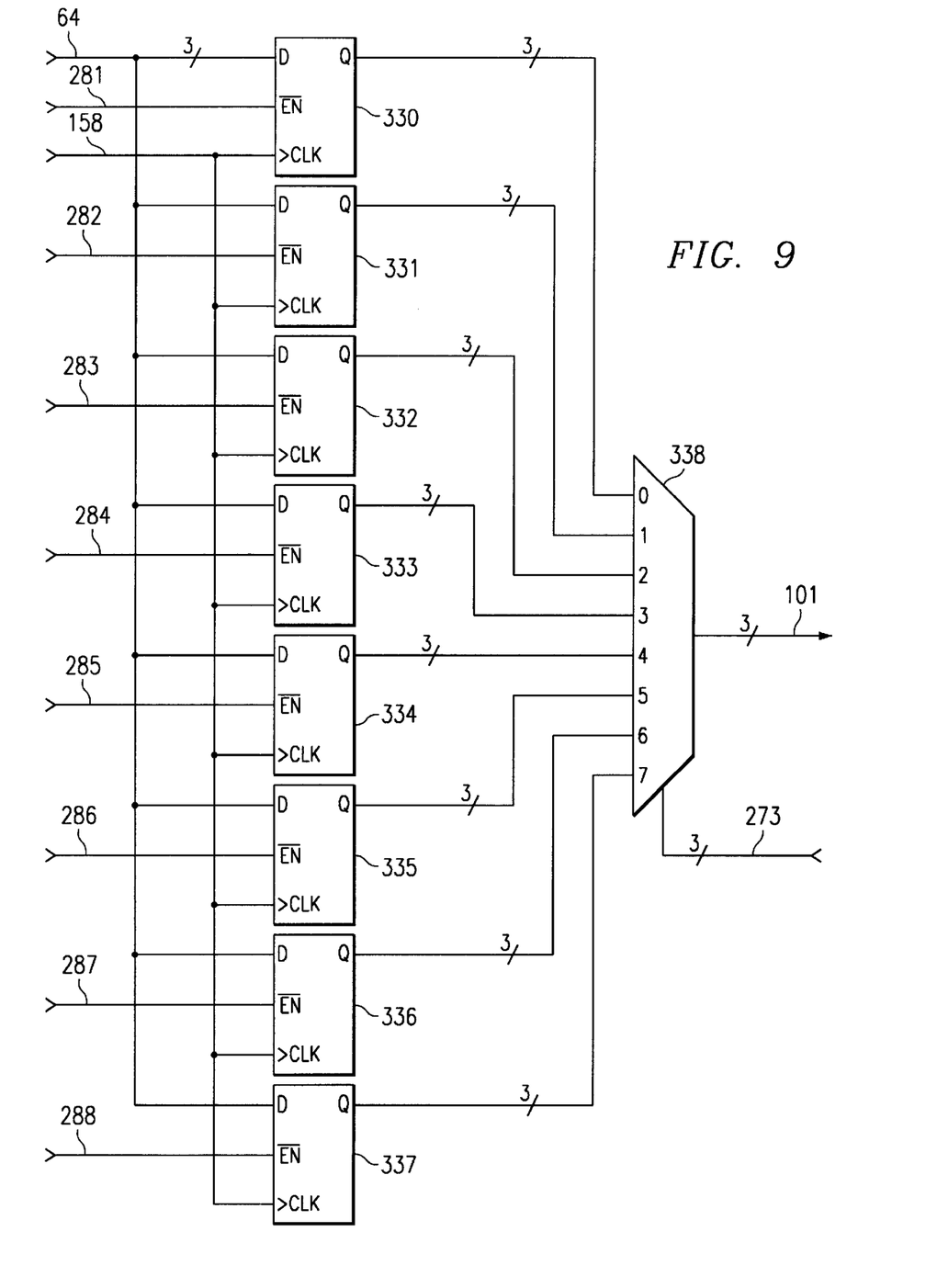
FIG. 9 is a logic diagram showing the FIFO registers of the group 1 FIFO of FIG. 4.

Turning now to FIG. 9, there are shown the FIFO registers, where the member IDs are actually stored. These FIFO registers are implemented as a set of eight registers 330–337. Each of the eight registers shown in the figure constitutes three flip-flops, storing the three bits of the member ID. The group 1 write enable signals WR0–WR7 (see FIG. 7) are provided on lines 281–288, respectively to the inverting enable inputs of registers 330–337, respectively. The member ID I[3:1] of the interrupt to be stored is provided on bus 64 to the D inputs of all of the registers 330–337. Thus, I[3:1] is stored at the register location determined by the write enable signal line 281–288 that is active.

The Q outputs of registers 330–337 are provided to inputs 0–7, respectively, of an 8-input MUX 338. The output of MUX 338 is bus 101 carrying the member ID field currently output from the group 1 FIFO. The SELECT input of MUX 338 is line 273 carrying the read pointer signal RR[2:0]. Thus, I[3:1] is read from the register location determined by the value of the read pointer signal RR[2:0].

Figure 10:
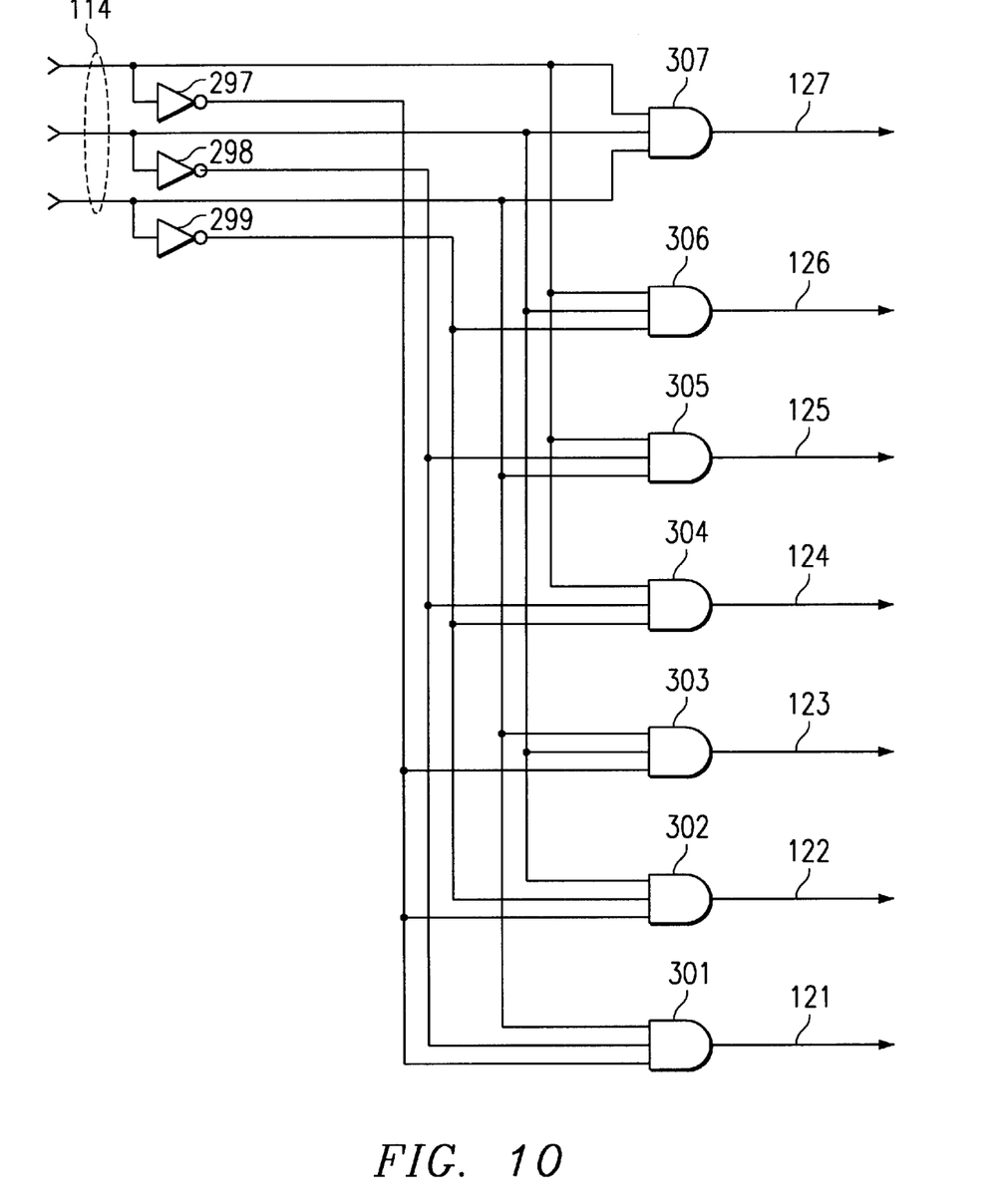
FIG. 10 is a logic diagram showing a portion of the group 1 FIFO 68 implementing FIFO read enable logic.

Turning now to FIG. 10, there is shown a portion of the group 1 FIFO 68 implementing FIFO read enable logic. The circuit of FIG. 10 operates to decode the value on bus 114 and activate the corresponding groups read enable line, such as line 121 carrying $RE_{g1}$. The three bits of the $CL_{sirs}$ signal on bus 114 are provided as inputs to this circuit. Eight 3-input AND gates 301–307 are provided, with the outputs thereof comprising the group read enable signals. Thus, for example, the output of AND gate 301 is line 121 carrying the signal $RE_{g1}$. Likewise, the outputs of AND gates 301–307 carry the read enable signals for groups 1–7. The MSB of the $CL_{sirs}$ signal on bus 114 is provided as an input to an inverter 297 and to AND gates 304–307. The output of inverter 297 is provided as an input to AND gates 300–303. The next less significant bit of the $CL_{sirs}$ signal on bus 114 is provided as an input to an inverter 298, and to AND gates 302, 303, 306 and 307. The output of inverter 298 is provided as an input to AND gates 300, 301, 304 and 305. The LSB of the $CL_{sirs}$ signal on bus 114 is provided as an input to an inverter 299, and to AND gates 301, 303, 305 and 307. The output of inverter 299 is provided as an input to AND gates 300, 302, 304 and 306.

Figure 11:
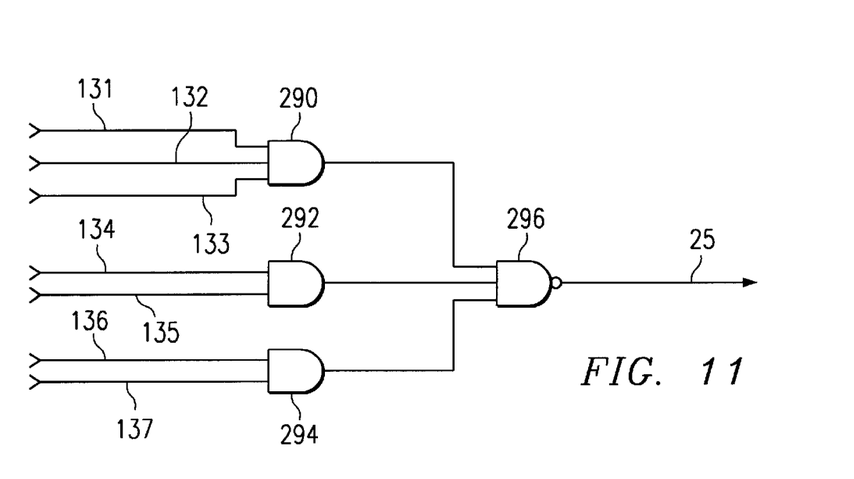
FIG. 11 is a logic diagram showing the circuitry for generating an interrupt request signal.

FIG. 11 shows how the interrupt request signal INTRQ on line 25 is generated. The lines carrying the FIFO empty signals for each of the groups, e.g., line 130 (group 1), is provided as an input to one of three AND gates 290, 292, 294, the outputs of which are provided as inputs to a 3-input NAND gate 296. Note that AND gates 290, 292, 294, and NAND gate 296 together are the equivalent of 7-input NAND gate 32 shown in FIG. 2. Basically, if all of the FIFO empty signal lines are active, meaning that no interrupt is pending (all FIFOs are empty), the INTRQ line 25 is held low. If one or more of the FIFO empty signal lines is not active, the INTRQ line 25 is driven high.

Figure 12:
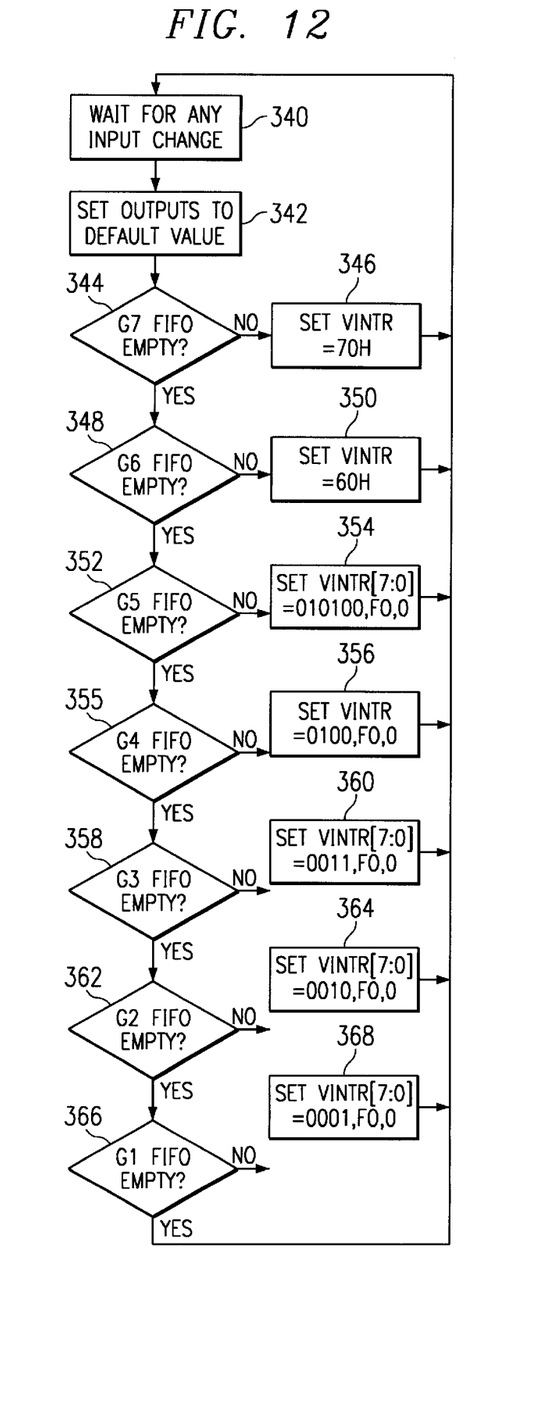
FIG. 12 is a flow chart showing the operation of the IPE 106 of FIG. 4.

FIG. 12 is a flow chart showing the operation of the interrupt priority encoder (IPE) 106 of FIG. 4. Note that FIG. 11 and FIG. 10 together make up IPE 106. FIG. 12 shows the logic flow for providing the winning interrupt request vector to bus 112. According to this logic, an interrupt request signal $V_{intrq}$ is generated on signal line 25 only if one of the FIFOs is not empty. The winning interrupt vector on bus 112 continuously drives the interrupt vector read value $V_{intr}$ on bus 34 until the interrupt vector read signal $V_{intrd}$ on line 27 is active for one clock cycle, at which time the current value on bus 112 is latched to bus 34. The signal $V_{intrd}$ on line 27 is generated by the microprocessor read interrupt vector register transaction. After the microprocessor finishes serving the winning interrupt request, it writes to the interrupt vector register with an arbitrary value, which is used as an interrupt acknowledge signal $V_{intak}$ on line 29 for this transaction. The signal $V_{intak}$ on line 29 activates the $CL_{sirs}$ signal on bus 114. For example, if the Group 7 FIFO generates the interrupt request and has been served by the microprocessor, the value on bus 114 is 111 and the Group 7 read enable signal $RE_{g7}$ is generated on line 127. After the Group 7 read enable signal is generated the Group 7 FIFO may change from not empty to empty.

Thus, returning to FIG. 12, the start state in the logic of FIG. 12 is waiting for any input change 340, during which the outputs are set to default values 342. When an input change occurs, interrupt priority is evaluated between groups. Thus signal line 137 is examined to determine if the group 7 FIFO 100, i.e., the "virtual FIFO register," is empty 344. If not, the interrupt vector register is set to the value 70h, where the lower case letter h indicates hex representation, driving bus 112 with 70h as the winning interrupt vector 346, and the system loops to start state 340. If the determination in step 344 is YES, signal line 136 is examined to determine if the group 6 FIFO 96, i.e., the "virtual FIFO register," is empty 348. If not, the interrupt vector register is set to the value 60h 350, and the system loops to start state 340. If the determination in step 348 is YES, signal line 135 is examined to determine if the group 5 FIFO 92 is empty 352. If not, the interrupt vector register is set to the concatenated value 010100+the group 5 FIFO output+0 354, and the system loops to start state 340. If the determination in step 352 is YES, signal line 134 is examined to determine if the group 4 FIFO 86 is empty 354. If not, the interrupt vector register is set to the concatenated value 0100+the group 4 FIFO output+0 356, and the system loops to start state 340. If the determination in step 354 is YES, signal line 133 is examined to determine if the group 3 FIFO 80 is empty 358. If not, the interrupt vector register is set to the concatenated value 0011+the group 3 FIFO output+0 360, and the system loops to start state 340. If the determination in step 358 is YES, signal line 132 is examined to determine if the group 2 FIFO 74 is empty 362. If not, the interrupt vector register is set to the concatenated value 0010+the group 2 FIFO output+0 364, and the system loops to start state 340. If the determination in step 362 is YES, signal line 131 is examined to determine if the group 1 FIFO 68 is empty 366. If not, the interrupt vector register is set to the concatenated value 0001+the group 1 FIFO output+0 368, and the system loops to start state 340.

Although the present invention and its advantages have been described in detail, it should be understood that various changes, substitutions and alterations can be made herein without departing from the spirit and scope of the invention as defined by the appended claims.

What is claimed is:

1. A microprocessor interrupt controller capable of receiving a plurality of interrupt requests organized in a plurality of groups, at least one of said groups including a plurality of interrupt requests, and providing said interrupts requests to a microprocessor, comprising:

a plurality of storage units corresponding to said plurality of groups and capable of storing one or more of said interrupt requests, by group, and providing said interrupt requests so stored as outputs, on a first in first out basis;

at least one write arbiter unit associated with the storage unit for said at least one of said groups including a plurality of interrupt requests, for providing simultaneously pending interrupt requests of said at least one of said groups to said associated storage unit on a priority basis;

a priority encoder unit for receiving said interrupt requests stored in said storage units and providing said interrupt requests as outputs for processing by said microprocessor, on a priority basis.

2. A microprocessor interrupt controller as in claim 1, wherein at least one of said storage units is a first-in-first-out (FIFO) storage unit.

3. A microprocessor interrupt controller as in claim 2, wherein:

said controller is responsive to a clock signal having cycles, said interrupt requests within at least one group having said at least one FIFO storage unit associated therewith are prioritized among each other, and:

said arbitration unit associated with said at least one FIFO storage unit selects, in a particular cycle a highest priority interrupt request for storage in said FIFO storage unit.

4. A microprocessor interrupt controller as in claim 1, wherein:

said controller is responsive to a clock signal having cycles, said groups are prioritized among each other such that interrupt requests between groups are prioritized among each other, and said priority selection unit selects, in a particular cycle a highest priority interrupt request stored in said storage units.

5. A microprocessor interrupt controller as in claim 1, further comprising:

a control unit for providing a selected interrupt request to said microprocessor, and for clearing said storage unit associated with said selected interrupt request of said selected interrupt request.

* * * * *